Figure 1:
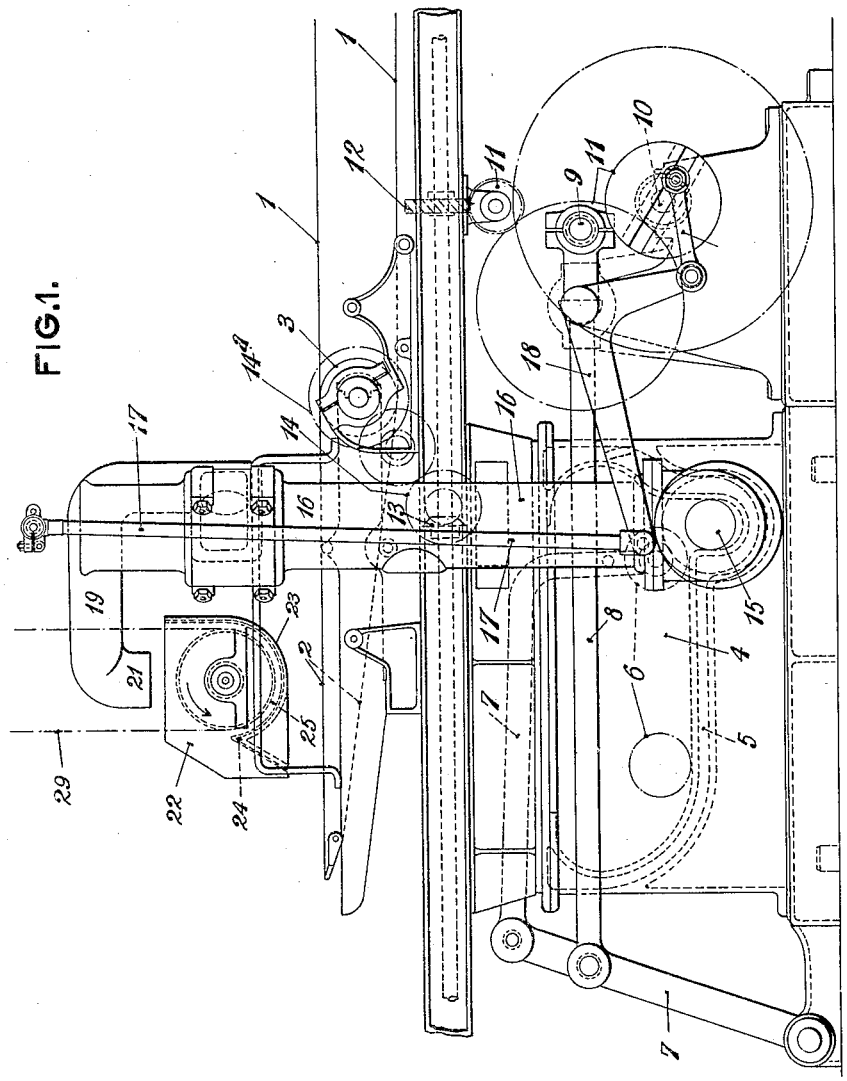

G. R. BAKER.
COATING OF CONFECTIONS AND THE LIKE.
APPLICATION FILED FEB. 14, 1920.

1,350,538.

Patented Aug. 24, 1920.
2 SHEETS—SHEET 2.

Inventor:
George Ralph Baker.
Attorney:

UNITED STATES PATENT OFFICE.

GEORGE RALPH BAKER, OF LONDON, ENGLAND, ASSIGNOR TO JOSEPH BAKER AND SONS LIMITED, OF LONDON, ENGLAND.

COATING OF CONFECTIONS AND THE LIKE.

1,350,538.                    Specification of Letters Patent.    Patented Aug. 24, 1920.

Application filed February 14, 1920. Serial No. 358,570.

*To all whom it may concern:*

Be it known that I, GEORGE RALPH BAKER, of London, N. W., 10, a subject of the King of England, have invented certain new and useful Improvements in the Coating of Confections and the like, of which the following is a specification.

This invention relates to the coating of confections and the like, and more particularly to the coating of "centers" or other goods with chocolate or similar substance in a more or less liquid condition.

The invention applies to that class of machine wherein the chocolate or coating material is flooded from above in a stream or sheet over the "centers" which are fed through this sheet and coated while passing beneath it, and in such type of machine the condition of the liquid chocolate at the moment the goods are coated with it has a very important effect on the resultant goods.

The chocolate coatings used in practice comprise a mixture of solid and liquid constituents, and the mixture must be applied when its temperature is very near the solidifying temperature of the liquid constituent. It is therefore highly desirable that the solid and liquid constituents should be intimately mixed together right up to the moment that the goods are coated, otherwise said constituents will tend to separate, and the finished goods will not have the desired gloss and color of high class goods. Further, it is desirable that in the coating mixture a proportion of the liquid constituent should exist in the solid state, to insure that the coating will set rapidly when once applied, which is also a highly desirable condition for high class work, as marks made on the top of the goods will stand out clearly and not run before the chocolate sets, and again, the coating will stay on the centers until set instead of running down and forming an enlarged base, which materially detracts from the appearance of the finished goods.

In machines with means for flooding the liquid chocolates over the centers while they are passed through, it has not been possible to get the chocolate into the desired condition as set forth above, but this is accomplished by the present invention by a novel method consisting in supplying the chocolate in liquid condition to the upper flooding tank (as by means of a pump or other elevating means from the usual lower supply tank which is jacketed to maintain the chocolate at the desired temperature, and is provided with stirring means to keep the chocolate in condition) and when the chocolate has reached said upper tank, a part thereof is cooled to render it of thicker consistency, this cooled part being mechanically mixed together with the more liquid portion in said upper tank immediately up to the time of flooding it over the centers. By this means a coating substance in the desired condition may be discharged over the centers for the purpose above stated.

The invention also comprises apparatus for carrying out the method above stated including any suitable supply tank with stirring or agitating means and a pump or other lifting means adapted to deliver the liquid therefrom to the upper or flooding tank, this latter, however, having a semicircular or curved bottom which is jacketed for reception of a cooling or tempering medium, such as water, air, or other means, and furnished with a mechanical mixing device adapted to thoroughly mix the partly cooled and liquid chocolate together until the moment that it is poured over the centers, which is preferably effected by allowing it to overflow from the tank through a suitably disposed weir or equivalent at one side thereof.

The means by which the "centers" are fed or moved along below the flooding tank may be of any appropriate or known kind, as may also other details of the apparatus, as these *per se* form no part of the present invention.

Figure 2:
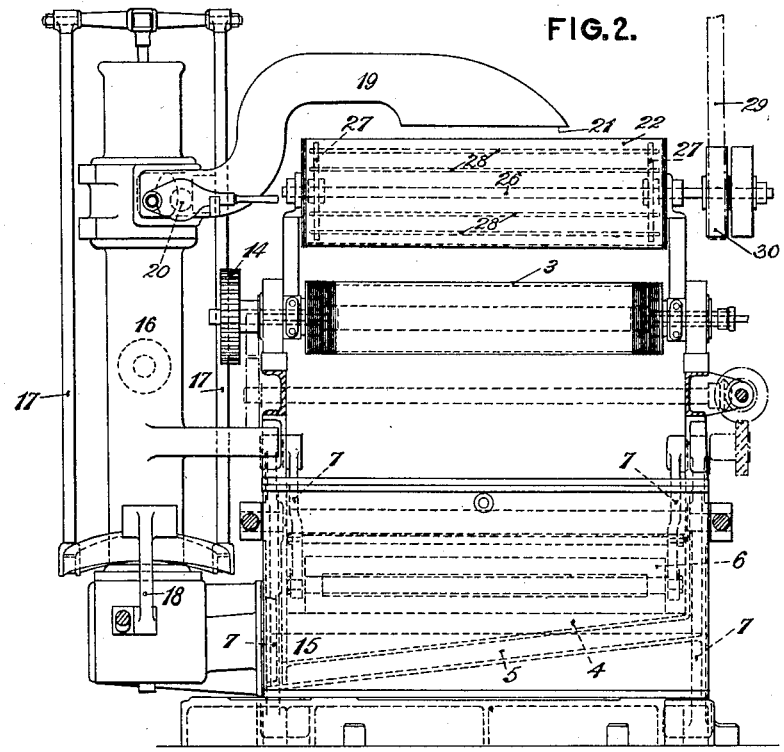
Figure 3:
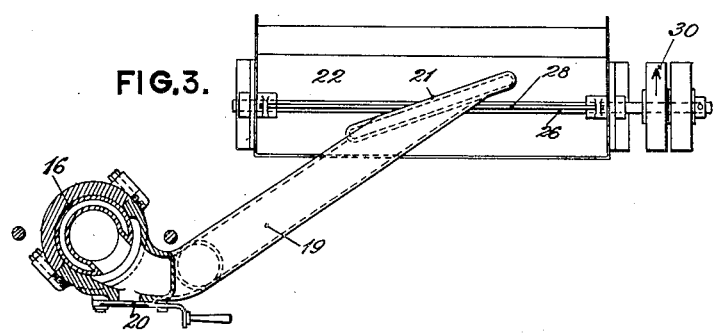

In the accompanying drawings there is illustrated as an example an embodiment of apparatus for carrying out the invention, Figure 1 being a side elevation; Fig. 2 an end elevation, and Fig. 3 a detail plan view partly in section of the pump chamber, upper flooding tank, and connecting feed arm hereinafter referred to.

The general features of the means shown in feeding the "centers" below the flooding tank and the pump operation, etc., are known, but briefly may be described as follows:—The "centers" are fed by mechanism, not shown, onto a conveyer 1, consisting of a series of parallel wires and thence to a second conveyer 2, similarly formed, adjacent ends of the said two conveyers passing about a common grooved roller 3. Below the second conveyer 2 is a "conche" or mixing tank 4 provided with a jacket 5 for a heating medium and with a stirring roller 6 which is moved back and forth in the tank by means of the lever system 7 operated through the connecting rod 8 and crank 9 driven off a main driving shaft 10. The conveyers are driven from said shaft 10 through a train of gears 11, spiral gears 12, miter gears 13, mutilated gears 14 (to produce intermittent movement of said conveyers) and gearing 14$^a$ acting on roller 3 to drive the conveyers.

From a sump 15 in the conche tank 4 the chocolate is conveyed by means of a pump 16 of any desired construction (operated by the rods 17 and lever system 18) to the feed-arm 19 at the top of the machine, the flow to said feed-arm being under control of a manually operated valve 20. The said feed-arm is shaped to deliver the chocolate through its nozzle 21 to the upper flooding tank 22 disposed above the conveyer 2. The said flooding tank extends right across the conveyer, has a semicircular base 23 terminating at one side in an inclined surface 24 forming an overflow weir, and is jacketed at 25 for reception of a cooling or tempering medium.

Within the flooding tank is a rotary stirrer, shown as comprising a shaft 26 carrying plates 27, between which are carried rods 28, the shaft being shown as driven from a different source of power to the other parts mentioned, by a belt 29 and pulley 30.

From the above description it will be apparent that the chocolate kept at the desired temperature and consistency in the conche tank 4 is delivered by the pump 16 to the feed-arm 19 and thence to the upper flooding tank 22 in which the lower part of the chocolate is partly cooled or rendered of thicker consistency, and this cooled part is mixed by the stirring means 26, 27, 28 with the more liquid chocolate delivered by the pump, the mixture being delivered over the inclined surface 24 in a stream onto the centers on the conveyer 2. Surplus chocolate passes through the spaces between the wires of said conveyer back to the conche tank 4.

The conditions hereinbefore stated for producing the best results in the finished goods are thus obtainable in a ready and efficient manner by mechanism of a simple character.

What I claim as my invention and desire to secure by Letters Patent of the United States is:—

1. A method of coating confectionery and the like with chocolate or similar substance consisting in feeding said substance in liquid consistency to a flooding vessel above the confections, cooling part of the substance in said vessel to render it of thicker consistency, mixing the thicker and thinner parts of the substance together in said vessel and then directly causing said mixed substance to overflow therefrom in a stream over the confections.

2. In apparatus for coating confectionery, the combination of an upper flooding vessel, an overflow surface or weir at one side of said vessel, a jacket for reception of a cooling medium for tempering the contents of said vessel, and mechanical means for stirring the contents thereof.

3. In apparatus for coating confectionery, the combination of an upper flooding vessel, an overflow surface or weir at one side of said vessel, a jacket for reception of a cooling medium for tempering the contents of said vessel, mechanical means for stirring the contents thereof, means for feeding coating substance to said upper flooding vessel, and means for maintaining said substance at desired temperature and consistency.

In witness whereof I have signed this specification.

GEORGE RALPH BAKER.